United States Patent
Takahashi et al.

(10) Patent No.: US 6,882,728 B1
(45) Date of Patent: Apr. 19, 2005

(54) REPRODUCTION APPARATUS AND DECODING APPARATUS

(75) Inventors: Masaru Takahashi, Yokohama (JP); Toshifumi Takeuchi, Oota-ku (JP); Osamu Kawamae, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/392,564

(22) Filed: Sep. 9, 1999

(30) Foreign Application Priority Data

Apr. 28, 1999 (JP) .......................................... 11-121253

(51) Int. Cl.⁷ ............................................... H04N 7/167
(52) U.S. Cl. ....................................... 380/201; 382/100
(58) Field of Search ................................ 713/171, 168, 713/176; 380/54, 201, 202, 203, 4; 382/100; 705/57, 58–59

(56) References Cited

U.S. PATENT DOCUMENTS 5,719,937 A * 2/1998 Warren et al. .............. 380/203
5,949,877 A * 9/1999 Traw et al. ................. 713/171
6,480,607 B1 * 11/2002 Kori et al. .................. 380/201
6,577,810 B1 * 6/2003 Ogino ........................ 380/203

* cited by examiner

Primary Examiner—Kim Vu
Assistant Examiner—Thanhnga B. Truong
(74) Attorney, Agent, or Firm—Antonelli, Terry, Stout & Kraus, LLP

(57) ABSTRACT

Information or contents cannot be reproduced even from a regular storage medium which is encrypted in accordance with a predetermined encryption system, due to erroneous detection of watermarks.

Detection of the watermarks and restriction over reproduction depending thereon is conducted only in a case where the medium is not encrypted. In case of detecting that the data is not encrypted in accordance with a predetermined encryption system by an encryption detection circuit (10) and when the watermarks are detected by a watermark detection circuit (20), reproduction of the data is stopped by a reproduction restricting circuit (30). In a case that it is detected to be encrypted in the predetermined encryption system by the encryption detection circuit (10), the reproduction restricting circuit (30) will not stop the reproduction thereof.

12 Claims, 8 Drawing Sheets

FIG. 4

| ENCRYPTION SYSTEM DETECTION | WATERMARK DETECTION | INFORMATION ANALYSIS RESULT | REPRODUCTION |
|---|---|---|---|
| PREDETERMINED SYSTEM | — | — | YES |
| SYSTEM OTHER THAN THE PREDETERMINED SYSTEM OR NO CODING | DETECTED | — | NO |
| | NOT DETECTED | ABLE TO DETECT | YES |
| | | UNABLE TO DETECT | NO |

FIG. 8

| RECORDING MEDIUM | FORMAT | ENCRYPTION SYSTEM DETECTION | WATERMARK DETECTION | REPRO- DUCTION |
|---|---|---|---|---|
| DVD-ROM | VIDEO | CSS SYSTEM | — | YES |
| | | NO | DETECTED | NO |
| | | | NOT DETECTED | YES |
| DVD-RAM | REAL TIME RECORDING | ENCRYPTION SYSTEM FOR REAL TIME RECORDING | — | YES |
| | | NO | DETECTED | NO |
| | | | NOT DETECTED | YES |
| | STREAM RECORDING | ENCRYPTION SYSTEM FOR STREAM RECORDING | — | YES |
| | | NO | DETECTED | NO |
| | | | NOT DETECTED | YES |

FIG. 10

| AKE | DECRYPTION | DECODING | WATERMARK DETECTION | OUTPUT |
|---|---|---|---|---|
| OPERATED | YES | OPERATED | — | YES |
| NOT OPERATED | NO | | DETECTED | NO |
| | | | NOT DETECTED | YES |
| OPERATED | YES | NOT OPERATED | — | NO |
| NOT OPERATED | NO | | | |

REPRODUCTION APPARATUS AND DECODING APPARATUS

BACKGROUND OF THE INVENTION

1. Field of the Invention

The present invention relates to the copyright protection, and in particular to a reproduction apparatus, in which the storage mediums being legally sold and distributed, as well as, being legally recorded can be reproduced therefrom, while bringing the mediums being illegally copied unable to be reproduced therefrom, and relates to a decoding apparatus, in which the codes which are reproduced from the storage mediums being legally sold and distributed and legally recorded therein can be decoded, while bringing the codes reproduced from the mediums being illegally copied unable to be decoded therefrom.

2. Description of Prior Art

As technologies relating to a video signal processing apparatus for certainly giving a protection under the copyright on video signals of high quality which can be obtained from video discs, digital VTRs, receivers for digital broadcasts and so on, a video signal processing method and recording mediums therefor, are disclosed, for example in Japanese Patent laying-Open No. Hei 10-178656 (1989). Also an authentication and key exchanges for copy protection is disclosed in NIKKEI ELECTRONICS 1998.3.23 (NO.712) P47–P53.

In the above patent laying-Open is disclosed, in particular a technology for copying protection by using a generation management information. However, it does not mention the technology for making unable the reproduction of storage mediums which are produced illegally.

For practicing such the copy protection with certainty, an encryption technology is very effective. Contents or information of video and audio to be recorded into the storage medium is encrypted, while a key for encryption is supplied only to a licensee, thereby enabling to make the reproduction of the storage medium which was produced illegally impossible or disabled.

However, once being reproduced by decrypting the code thereof, the contents of video and audio can be recorded freely into other storage medium(s), therefore it is impossible to practice the copy protection with certainty therewith. For protecting from such the copy, a technology of watermark is effective, in which a generation management information is superimposed onto the video and audio information in such a manner that they cannot be detected even if they are tried to sense visually and audibly. Namely, restricting the recording of the reproduced video and audio contents by detecting the watermarks thereof, or restricting the reproducing of the reproduced video and audio contents by detecting the watermarks thereof, it can be applied for protecting from the illegal copy, or from viewing the video and audio contents which are illegally copied.

Applying the technologies, such as of the encryption and the watermarks together, it is possible to practice the copy protection with higher certainty. Namely, it is enough that the watermarks are necessarily attached to the video and audio contents to be protected under the copyright and are necessarily encrypted on the storage medium. However, according to the conventional art, there is not paid enough considerations on a manner how to make unable the reproduction of the storage medium which was illegally produced in a case where the technologies of the encryption and the watermarks are applied together thereto. In particular, there is no consideration on a problem that the storage mediums, being legally sold and distributed or being legally recorded, may also be unable to be reproduced therefrom by erroneous detection of the watermarks thereof.

SUMMARY OF THE INVENTION

The present invention relates to the copyright protection, and in particular to a reproduction apparatus, in which the storage mediums being legally sold and distributed, as well as, being legally recorded can be reproduced therefrom, while bringing the mediums being illegally copied unable to be reproduced therefrom, and relates to a decoding apparatus, in which the codes which are reproduced from the storage mediums being legally sold and distributed and legally recorded therein can be decoded, while bringing the codes reproduced from the mediums being illegally copied unable to be decode therefrom.

An object, according to the present invention, is to provide a technology for bringing the storage mediums which are illegally produced unable to be reproduced therefrom, while bringing the storage mediums which are legally produced, sold and distributed, or the storage mediums which are recorded according to a legal method or manner, able to be reproduced therefrom, in the case where the technologies of the encryption and the watermark are applied together thereto, and in particular, to disclose the technology for dissolving the problem that the storage mediums being legally sold and distributed or being legally recorded may also be unable to be reproduced therefrom by the erroneous detection of the watermarks thereof, and to provide a reproduction apparatus and a decoding apparatus with using such the technologies.

According to the present invention, there is provided a reproduction apparatus for reproducing video or audio information recorded in a storage medium, comprising: an encryption detection means for detecting whether the video or audio information recorded in said storage medium is encrypted or not in accordance with a predetermined encryption system; a watermark detection means for detecting a watermark information indicative of a copy management information, including at least copy prohibition (i.e., "never copy") which is superimposed onto the video or audio information, in a case where the video or audio information recorded in said storage medium is not encrypted in accordance with the predetermined encryption system; and a reproduction restricting means for stopping reproduction of the video or audio information, when any of the copy management information is detected upon a detection result by said watermark detection means, in a case where the video or audio information recorded in said storage medium is not encrypted in accordance with the predetermined encryption system.

Also, according to the present invention, there is provided the reproduction apparatus as defined in the above, further including: an information analysis means for analyzing whether the video or audio information recorded in said storage medium is a regular video or audio information or not, from which the watermark can be detected in the watermark detection circuit, in the case where the video or audio information recorded in said storage medium is not encrypted in accordance with the predetermined encryption system, wherein said reproduction restricting means stops the reproduction of the video or audio information, also when it is not decided to be the regular video or audio information from which the watermark can be detected, in the case where the video or audio information recorded in said storage medium is not encrypted in accordance with the predetermined encryption system.

Further, according to the present invention, there is provided a decoding apparatus, being inputted with coded video or audio information, for decoding the video or audio information so as to be outputted, comprising: a decryption means for restoring an original video or audio information which is encoded by decrypting an input code data which is encrypted; a watermark detection means for detecting a watermark information indicative of a copy management information, including at least copy prohibition (i.e., the "never copy") which is superimposed onto the video or audio information, in case of decoding the encoded video or audio information which is inputted, directly without using said decryption means; a reproduction restricting means for stopping reproduction of the video or audio information, when any copy management information is detected upon a detection result by said watermark detection means, in case of decoding the encoded video or audio information which is inputted, directly without using said decryption means.

Further, according to the present invention, there is also provided the reproduction apparatus as defined in the above, further including: a medium and format deciding means for deciding a kind from a plurality of storage mediums and a recording format thereof, wherein said encryption detection means detects whether the data on said medium is encrypted or not in accordance with an encryption system which is predetermined for each of the kinds of said plurality of storage mediums and the recording format thereon, and, said reproduction restricting means stops reproduction of the video or audio information when any of the copy management information is detected upon detection result by said watermark detection means, in case that the video and audio information is not coded in accordance with an encryption system which is predetermined for each of the kinds of said plurality of storage mediums and the recording format thereon.

Moreover, according to the present invention, there is provided a decoding apparatus, being inputted with encoded video or audio information, for decoding the video or audio information so as to be outputted, comprising: a decryption means for restoring an original video or audio information which is encoded by decypting an input code data which is encrypted; an AKE (Authentication and Key Exchange) means for conducting a authentication between a source device of the input code data and key exchange necessary for decryption; a watermark detection means for detecting a watermark information indicative of a copy management information, including at least copy prohibition (i.e., the "never copy") which is superimposed onto the video or audio information, if the decoding is started under a condition where the authentication and the key exchange are not yet established in said AKE means; and a reproduction restricting means for stopping reproduction of the video or audio information, when any of the copy management information is detected upon a detection result by said watermark detection means, if the decoding is started under a condition where the authentication and the key exchange are not yet established in said AKE means.

According to the present invention, in the reproduction apparatus for reproducing the video or audio information which is recorded in the storage medium, since the reproduction is stopped when the watermarks can be detected, for the storage medium which is not encrypted in the predetermined encryption system, it is possible to stop viewing of the storage medium which is illegally copied, while performing the reproduction with certainty even if the watermarks may be detected erroneously, for the regular storage medium which is encrypted in the predetermined encryption system.

Also, according to the present invention, it is also possible to stop the reproduction in a case where the watermarks are encrypted in accordance with an illegal encryption system so that the watermark information cannot be detected.

Furthermore, according to the present invention, in the decoding apparatus for decoding the encoded video or audio information, since the decoding can be stopped if there can be detected the watermarks in the codes which are not encrypted in accordance with the predetermined encryption system, it is possible to stop viewing by decoding the codes from the storage medium which is illegally copied, while performing the decoding with certainty even if the watermarks may be detected erroneously, with the regular codes which are encrypted in the predetermined encryption system.

Further, according to the present invention, it is possible to stop viewing of the storage medium which is illegally copied when reproducing from the storage mediums of various kinds of recording formats on which different encryption systems are determined, while the reproduction is performed with certainty even if the watermarks may be detected erroneously, with the regular storage mediums which are encrypted in the predetermined encryption systems.

Also, according to the present invention, it is possible to stop viewing by decoding the codes from the storage medium being copied illegally on which AKE does not operate, while the decoding can be performed with certainty even if the watermarks may be detected erroneously, with the regular codes on which the AKE operates.

BRIEF DESCRIPTION OF THE DRAWINGS

FIG. 4 shows an example of reproducing condition in the another embodiment of the reproduction apparatus according to the present invention;

FIG. 8 shows an example of the reproducing condition in the other embodiment of the reproduction apparatus according to the present invention;

FIG. 10 shows an example of the output condition in the another embodiment of the decoding apparatus according to the present invention.

DETAILED DESCRIPTION OF PREFERRED EMBODIMENTS

Hereinafter, embodiments according to the present invention will be fully explained by referring to the attached drawings.

Figures 1, 2:
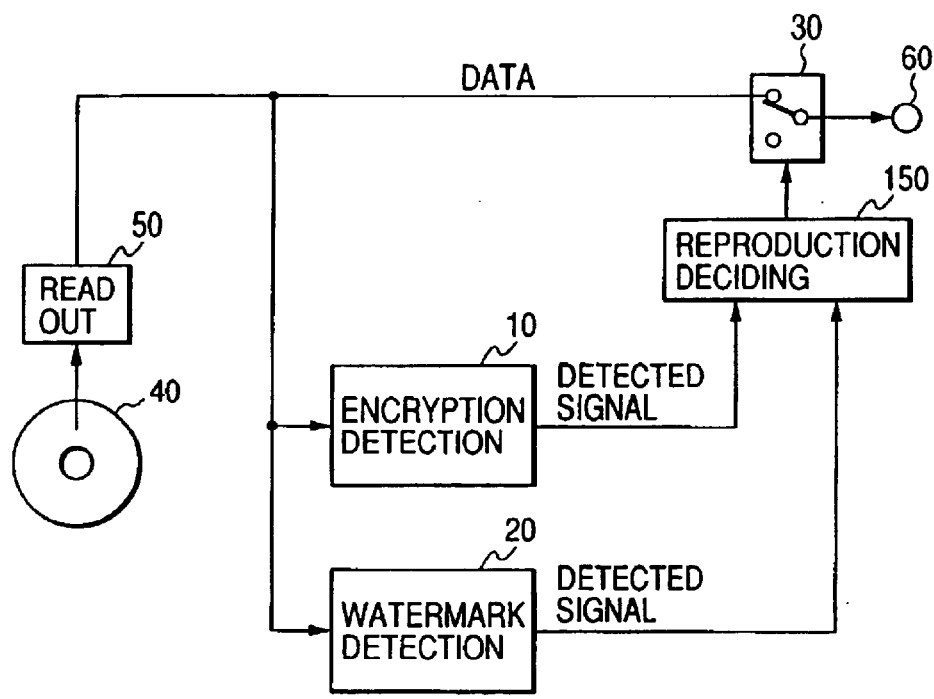
FIG. 1 is a block diagram for showing an embodiment of a reproduction apparatus according to the present invention.
FIG. 2 shows an example of the reproducing condition in the embodiment of the reproduction apparatus according to the present invention.

FIG. 1 is a block diagram of showing a flow of signals in an embodiment of a reproduction apparatus according to the present invention. In FIG. 1, a reference numeral 10 indicates an encryption detection circuit, 20 a watermark detection circuit, 30 a reproduction restriction circuit, 40 a storage medium, 50 a reading circuit, 60 a reproduction data outputting terminal, and 150 a reproduction deciding circuit.

The present embodiment is a drive, i.e., for reproducing from the storage medium, such as a DVD-ROM or a DVD-RAM, etc. The reading circuit 50 reads out data from the storage medium 40, and supplies the read out data being coded into the encryption detection circuit 10, the watermark detection circuit 20 and the reproduction restriction circuit 30.

For example, for the DVD-ROM is prepared a method, for the purpose of protecting the video contents or information to be recorded under the copyright, in which moving picture data being compressed with a MPEG 2 system or method is encrypted to be recorded, and the similar method has been studied or investigated for the DVD-RAM. Further, for the purpose of restricting the copy with respect to the video information which has been decrypted from the encryption thereof, the watermark method has also been studied or investigated, in which the copy management information is superimposed onto the video information in such a form that it cannot be detected by viewing it directly. According to the present embodiment, it is possible to reproduce from such the DVD-ROM and DVD-RAM, to which the encryption is treated and the watermarks are inserted.

The encryption detection circuit 10 detects an information being recorded on the storage medium 40, indicating that a disc is encrypted in accordance with a predetermined encryption method.

The watermark detection circuit 20 detects the watermarks superimposed onto the video information which is recorded on the storage medium 40.

The reproduction deciding circuit 150, depending upon a condition, decides whether the moving picture data should be outputted from the reproduction data outputting terminal 60 or not, and depending upon the decision result, the reproduction restricting circuit 30 supplies the moving picture data into the reproduction data outputting terminal 60 when the output should be provided with, while it does not supply it when the output should not be provided. FIG. 2 is a view of showing a reproduction condition. In a case of the disc which is encrypted, since it is a regular disc on which the protection under the copyright should be given legally, then the data is reproduced therefrom. In a case of the disc which is not encrypted, it is considered to be the disc being illegally copied when the watermarks can be detected by the watermark detection circuit 20, so as to be stopped from the reproduction operation thereof. In the case of the disc which is not encrypted, but when the watermarks cannot be detected by the watermark detection circuit 20, it is brought into the reproduction operation as it is since it is not the disc on which the protection should be given under the copyright. Thereby, it is possible to stop viewing of the disc which is illegally copied, therefore the reproduction will not be erroneously stopped even if the watermarks is erroneously detected when it is reproduced from the regular disc which is encrypted.

Figure 3:
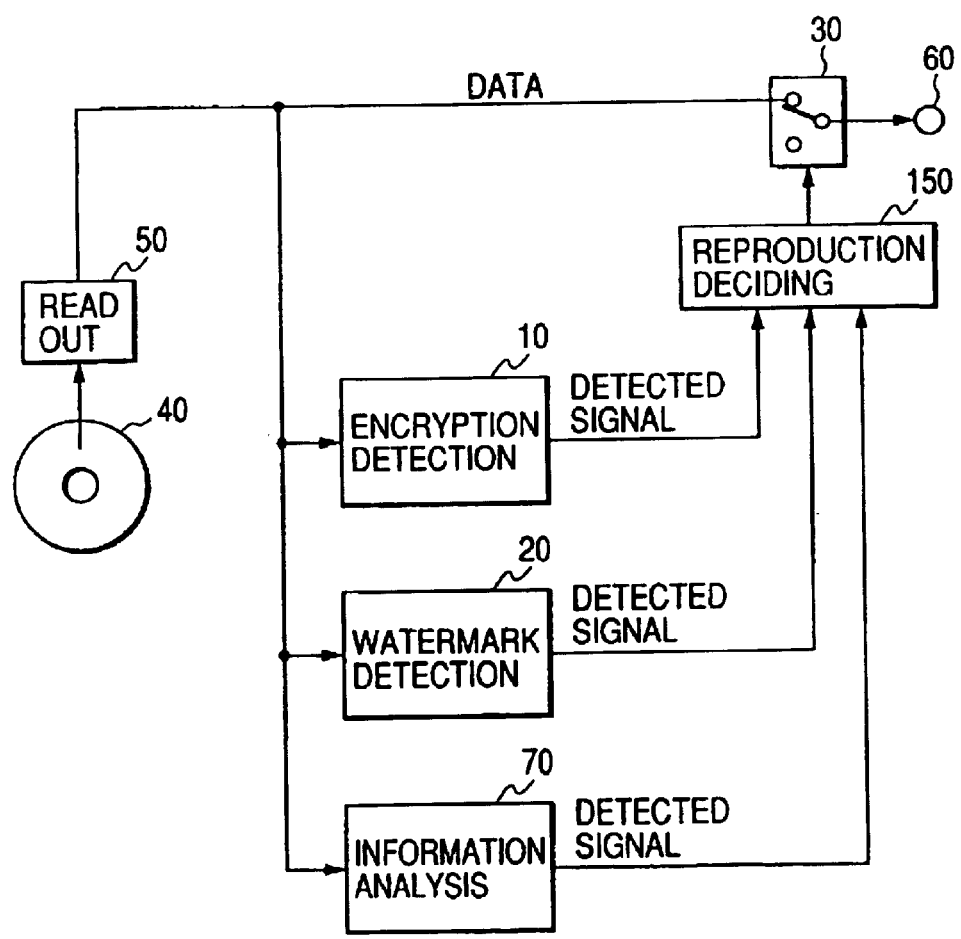
FIG. 3 is a block diagram for showing another embodiment of the reproduction apparatus according to the present invention.

FIG. 3 is a block diagram of showing a flow of signals in another embodiment of a reproduction apparatus according to the present invention. In FIG. 3, a reference numeral 10 indicates a encryption detection circuit, 20 a watermark detection circuit, 30 a reproduction restriction circuit, 40 a storage medium, 50 a reading circuit, 60 a reproduction data outputting terminal, 70 an information analyzing circuit, and 150 a reproduction deciding circuit.

The present embodiment is also a drive, i.e., for reproducing from the storage medium, such as a DVD-ROM or a DVD-RAM, etc. The reading circuit 50 reads out data from the storage medium 40, and supplies the read out data being coded into the encryption detection circuit 10, the watermark detection circuit 20, the reproduction restriction circuit 30 and the information analyzing circuit 70.

The encryption detection circuit 10 detects an information being recorded on the storage medium 40, indicating that a disc is encrypted in accordance with a predetermined encryption method.

The watermark detection circuit 20 detects the watermarks superimposed onto the video information which is recorded on the storage medium 40.

The information analyzing circuit 70 analyzes whether the input data to the watermark detection circuit 20 is the regular input data or not, from which the watermarks can be detected therefrom. In more details, according to the present embodiment, it is investigated whether it is the regular data or not, which is consistent with the MPEG 2 system.

The reproduction deciding circuit 150, depending upon a condition, decides whether the moving picture data should be outputted from the reproduction data outputting terminal 60 or not, and depending upon the decision result thereof, the reproduction restricting circuit 30 supplies the moving picture data to the reproduction data outputting terminal 60 when the output should be provided with, while it does not supply it when the output should not be provided. FIG. 4 is a view of showing a reproduction condition. In a case of the disc which is encrypted, since it is a regular disc on which the protection should be given legally under the copyright, then the data is reproduced therefrom. In a case of the disc which is not encrypted, it is considered to be the disc being illegally copied when the watermarks can be detected by the watermark detection circuit 20, so as to be stopped from the reproduction operation thereof. In the case of the disc which is not encrypted, when the watermarks cannot be detected by the watermark detection circuit 20 therefrom, and further when the data is the regular input data from which the watermarks can be detected, it is brought into the reproduction operation as it is since it is not the disc on which the protection should be given under the copyright. In the case of the disc which is not encrypted, when the watermarks cannot be detected by the watermark detection circuit 20 therefrom, and further when the data is the irregular input data from which the watermarks cannot be detected, it is considered to be a disc which is illegally encrypted so that the watermarks cannot be detected therefrom, then the reproduction is stopped. Thereby, it is also possible to stop the viewing of the disc which is illegally copied so that the watermarks cannot be detected therefrom.

Figures 5, 6:
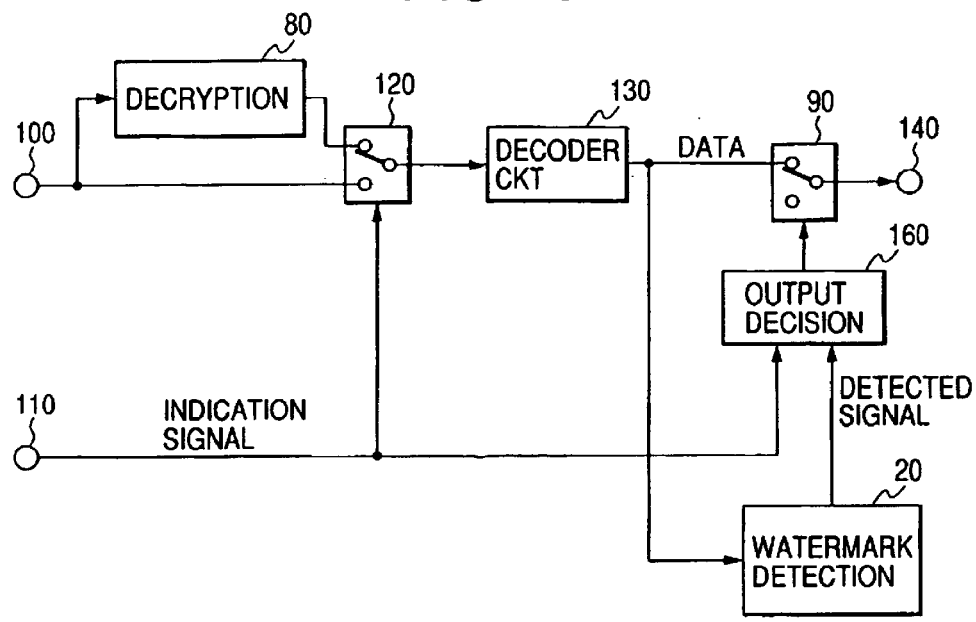
FIG. 5 is a block diagram for showing an embodiment of a decoding apparatus according to the present invention.
FIG. 6 shows an example of the output condition in the embodiment of the decoding apparatus according to the present invention.

FIG. 5 is a block diagram of showing a flow of signals in an embodiment of a decoding apparatus according to the present invention. In FIG. 5, a reference numeral 20 indicates an watermark detection circuit, 80 a decryption circuit, 90 an output restriction circuit, 100 a coded data input terminal, 110 an input terminal for designating ON or OFF for the decryption, 120 a selection circuit, 130 a decoder circuit, 140 a decoded data output terminal, and 160 an output decision circuit.

The present embodiment is a decoder board, for decoding the moving picture data which is compressed with the MPEG 2 system. At the coded data input terminal 100 is inputted the coded data which is reproduced from the storage medium, such as the DVD-ROM or DVD-RAM.

According to the present embodiment, it is possible to decode the coded data reproduced from the DVD-ROM or DVD-RAM which is encrypted. The decryption circuit 80 is the circuit for decryption thereof.

At the input terminal for designating ON or OFF for the decryption 110 is inputted a signal for indicating to decrypt when reproducing the encrypted disc, and a signal indicating not to decrypt is inputted in the cases other than that. The selection circuit 120 selects the coded data which is decrypted within the decryption circuit 80 when decrypting, while it selects the coded data inputted at the coded data input terminal 100 when not decrypting, so as to supply it to the decoder circuit 130. The decoder circuit 130 conducts decoding processes on the basis of the MPEG 2 system so as to decode the moving picture data. The decoded moving picture data is outputted from the decoded data output terminal 140.

The output deciding circuit 160, depending upon a condition, decides whether the moving picture data should be outputted from the decoded data output terminal 140 or not, and depending upon the decision result thereof, the output restriction circuit 90 supplies the moving picture data at the decoded data outputting terminal 140 when the output should be provided with, while it does not supply that data when the output should not be provided. FIG. 6 is a view of showing an output condition. In a case of decryption, it provides an output since the data is a regular code protected under the copyright. In a case of not in the decryption, and when the watermarks can be detected by the watermark detection circuit 20, the data is considered to be the reproduced data of the disc which is illegally copied, so that the output is stopped. In the case of not in the decryption, and when the watermarks cannot be detected by the watermark detection circuit 20, the data is reproduced as it is since it is not protected under the copyright. Thereby, it is possible to stop viewing of the reproduced data from the disc which is illegally copied, therefore the output will not be erroneously stopped even if the watermarks is erroneously detected when the reproduced data is decoded from the regular disc which is encrypted.

The above explanation which was mentioned in the above was given only on the case where all is the video information, however the construction of an embodiment is same in a case of an audio information, except that the encoding and the decoding of video is replaced by the encoding and the decoding of audio, and that the watermarks of the video is replaced by the watermarks of the audio, thereby obtaining the same effects.

Figure 7:
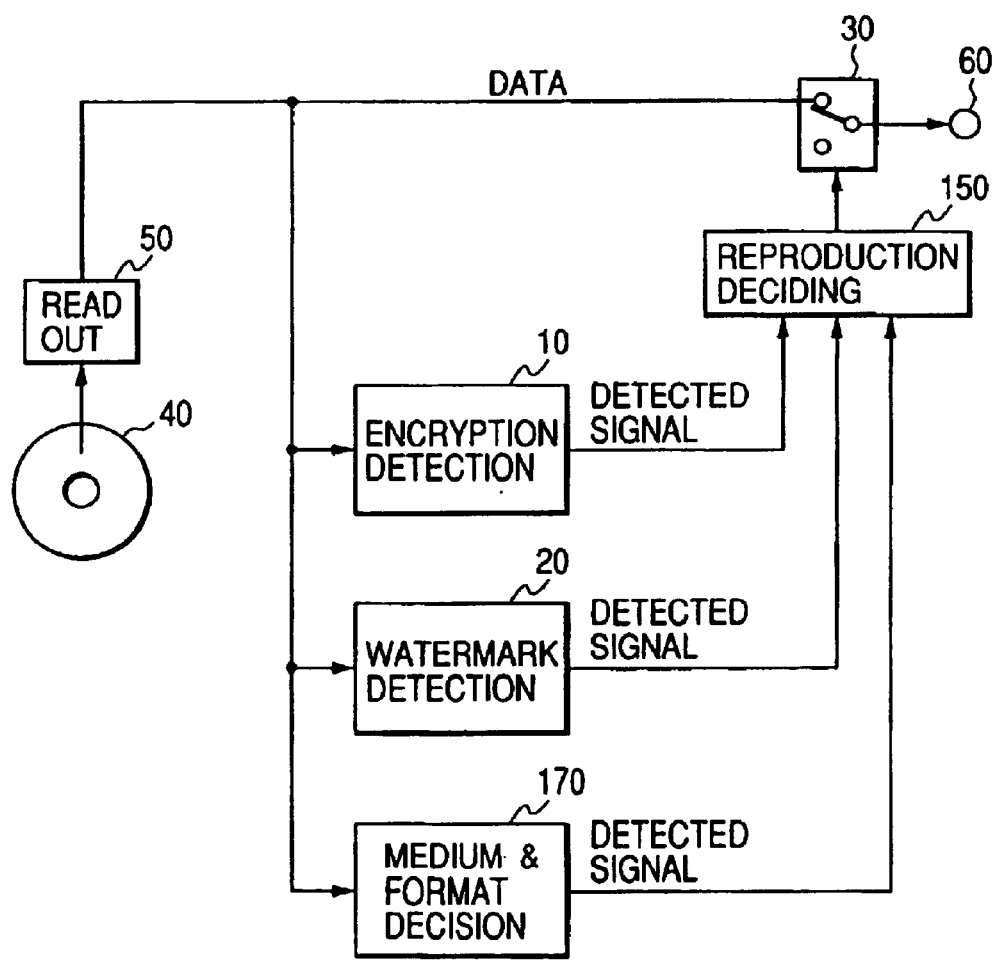
FIG. 7 is a block diagram for showing other embodiment of the reproduction apparatus according to the present invention.

FIG. 7 is a block diagram of showing flow of signals in an embodiment of a reproduction apparatus adopted for a plurality kinds of the storage mediums. In FIG. 7, a reference numeral 10 indicates an encryption detection circuit, 20 a watermark detection circuit, 30 a reproduction restriction circuit, 40 a storage medium, 50 a reading circuit, 60 a reproduction data outputting terminal, 150 a reproduction deciding circuit, and 170 a medium & format decision circuit.

The present embodiment is a drive, i.e., for reproducing from the plurality kinds of the storage mediums, such as a DVD-ROM and a DVD-RAM, etc. The reading circuit 50 reads out data from the storage medium 40, and supplies the coded read out data to the encryption detection circuit 10, the watermark detection circuit 20, the medium & format decision circuit 170 and the reproduction restriction circuit 30.

An encryption system which is prepared for the DVD-ROM for use of video information (i.e., a DVD-Video format) is called by CSS (Content Scrambling System). Though the same system is studied or investigated for the DVD-RAM, but it is an encryption system being different from that CSS system. Also, among the DVD-RAMs, there are a real time recording format with which the video information is recorded while being compressed with the MPEG 2 system at the same time, and a stream recording format with which a bit stream being already compressed with the MPEG 2 system is recorded as it is. In the case of the stream recording, the bit stream being already compressed is transmitted under the condition where it is encrypted. Both the encryption system of the real time recording format and the encryption system of the stream recording format are prospected to be different in the encryption systems thereof. The present embodiment enables to reproduce all of those discs and to meet those encryption systems.

The medium & format decision circuit 170 decides the sort or kind, as well as the recording format of the storage medium 40.

The encryption detection circuit 10 detects an information indicating that a disc is encrypted in accordance with a predetermined ncryption system corresponding to the kind and the recording format of the storage medium 40.

The watermark detection circuit 20 detects the watermarks superimposed onto the video information which is recorded on the storage medium 40.

The reproduction deciding circuit 150, depending upon a condition, decides whether the moving picture data should be outputted from the reproduction data outputting terminal 60 or not, and depending upon the decision result thereof, the reproduction restricting circuit 30 supplies the moving picture data to the reproduction data outputting terminal 60 when the output should be provided with, while it does not supply it when the output should not be provided. FIG. 8 is a view of showing a reproduction condition. In a case that the encryption system is the CSS system and in the DVD-ROM Video format, it is reproduced since it is the regular disc which is protected under the copyright. In a case that the encryption system is one for the real recording format and in the real recording format, it is reproduced since it is the regular disc which is protected under the copyright. In a case where the encryption system is one for the stream recording format and in the DVD-RAM stream recording format, it is reproduced since it is the regular disc which is protected under the copyright. In each of the formats, and in a case of the disc which is not encrypted, the disc is considered to be the disc that is illegally copied when the watermarks can be detected by the watermark detection circuit 20, so that the reproduction is stopped. In a case of the disc being not encrypted, when the watermarks cannot be detected by the watermark detection circuit 20, it is reproduced as it is since it is the disc which is not protected under the copyright.

According to the present embodiment, it is also possible to stop viewing of the disc which is illegally copied even when reproducing the discs of the plurality of recording formats in which different encryption systems are determined, therefore the reproduction will not be erroneously stopped even if the watermarks is erroneously detected when it is reproduced from the encrypted regular disc.

Figure 9:
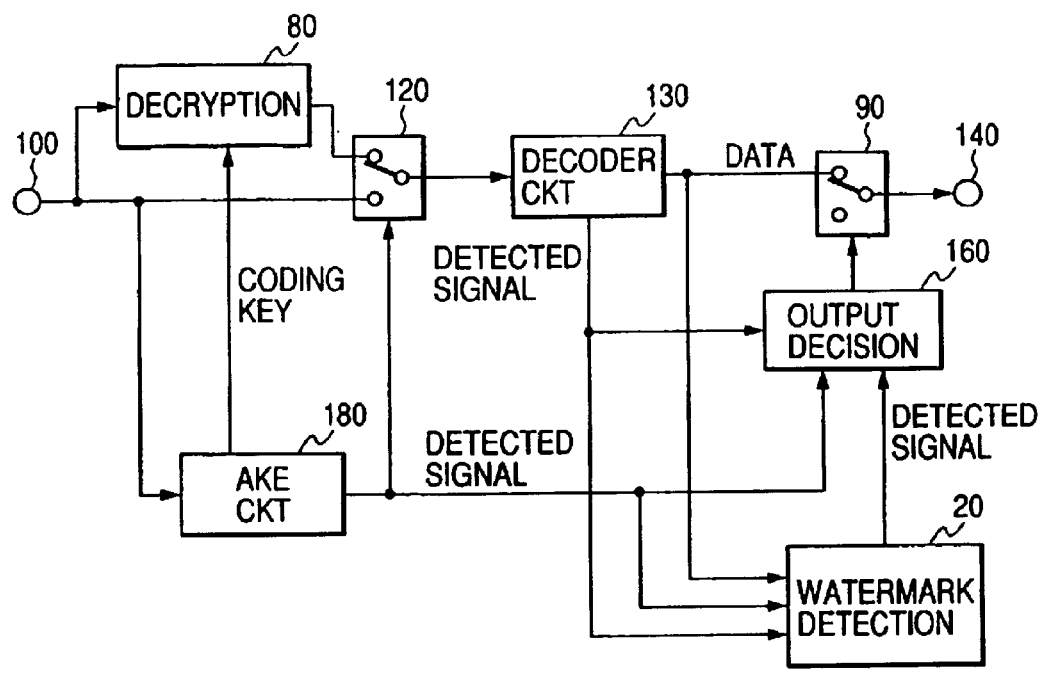
FIG. 9 is a block diagram for showing another embodiment of the decoding apparatus according to the present invention.

FIG. 9 is a block diagram of showing flow of signals in an embodiment of a decoding apparatus attached with AKE (Authentication and Key Exchange). In FIG. 9, a reference numeral 20 indicates a watermark detection circuit, 80 an decryption circuit, 90 an output restriction circuit, 100 a coded data input terminal, 120 a selection circuit, 130 a decoder circuit, 140 a decoded data output terminal, 160 an output decision circuit and 180 an AKE circuit.

The present embodiment is a decoder board, for decoding the moving picture data which is compressed with the MPEG 2 system. At the coded data input terminal 100 is inputted the coded data which is reproduced from the storage medium, such as the DVD-ROM or DVD-RAM.

In the present embodiment, in which the AKE circuit 180 is installed, a key is obtained through an authentication and key exchange between an external apparatus with the AKE circuit 180 when receiving the encrypted code data from that external apparatus, such as the DVD-ROM drive or DVD-RAM drive so as to decoding it, thereby conducting the decryption by using this key. The decryption circuit 80 is the circuit for decryption.

The selection circuit 120 selects the coded data which is decrypted within the decryption circuit 80 when the AKE is established and the code should be decrypted, while it selects the coded data inputted at the coded data input terminal 100 when the AKE is not established and no code should be decrypted, thereby supplying it to the decoder circuit 130. The decoder circuit 130 conducts the decoding processes on the basis of the MPEG 2 system so as to decode the moving picture data. When being inputted with the regular MPEG 2 data and when the decoding is started, it transmits the data to the watermark circuit 20 and the output decision circuit 160. The decoded moving picture data is outputted from the decoded data output terminal 140.

The electronic watermark circuit 20 detects the watermarks of the moving picture data which is decoded, when the decoding is started in spite of the fact that the AKE is not established.

The output deciding circuit 160, depending upon a condition, decides whether the moving picture data should be outputted from the decoded data output terminal 140 or not, and depending upon the decision result thereof, the output restriction circuit 90 supplies the moving picture data at the decoded data outputting terminal 140 when the output should be provided with, while it does not supply that data when the output should not be provided. FIG. 10 is a view of showing an output condition. In a case of decrypting when the AKE is established, the data is outputted since it is the regular code being protected under the copyright when the decoding operates in a case of not decryption since the AKE is not established, and in particular, when the decoding operates and the watermarks are detected by the watermark detection circuit 20, the data is considered to be the reproduced data of the disc which is illegally copied so that the output is stopped. In the case of not decryption since the AKE is not established, and also when the decoding operates, but when watermarks are not detected by the watermark detection circuit 20, the data is outputted as it is since it is the code which is not protected under the copyright. When the decoding does not operate, the output is stopped. Though it may be outputted, however, no meaningful moving picture data is outputted since at this moment no decoding is performed thereon.

Thereby, it is possible to stop viewing of the reproduced data from the illegally copied disc on which no AKE operates, therefore the output will not be erroneously stopped even if the watermarks is erroneously detected when the reproduced data is decoded from the regular encrypted disc on which the AKE operates.

What is claimed is:

1. A reproduction apparatus for reproducing video or audio information recorded in a storage medium, comprising:
    an encryption system detection means for detecting whether the video or audio information recorded in said storage medium is encrypted or not in accordance with a predetermined encryption system;
    an electronic watermark detection means for detecting an electronic watermark information indicative of a copy management information, including at least copy prohibition which is superimposed onto the video or audio information, in a case where the video or audio information recorded in said storage medium is detected in said encryption system detection means as being not encrypted in accordance with the predetermined encryption system; and
    a reproduction restricting means for controlling reproduction of the video or audio information in accordance with said copy management information, when any of the copy management information is detected upon a detection result by said watermark detection means, in a case where the video or audio information recorded in said storage medium is not encrypted in accordance with the predetermined encryption system.

2. A reproduction apparatus as defined in the claim 1, comprising:
    an information analysis means for analyzing whether the video or audio information recorded in said storage medium is a regular video or audio information or not, from which the electronic watermark can be detected in the watermark detection means, in the case where the video or audio information recorded in said storage medium is not encrypted in accordance with the predetermined encryption system, wherein
    said reproduction restricting means controls the reproduction of the video or audio information, when it is not decided to be the regular video or audio information from which the watermark can be detected, in the case where the video or audio information recorded in said storage medium is not encrypted in accordance with the predetermined encryption system.

3. A reproduction apparatus as defined in the claim 1, comprising:
    a medium and format deciding means for deciding a kind from a plurality of storage mediums and a recording format thereof, wherein,
    said encryption system detection means detects whether the data on said medium is encrypted or not in accordance with the encryption system which is corresponding to each of the kinds of said plurality of storage mediums and the recording format thereon, and,
    said reproduction restricting means controls reproduction of the video or audio information in accordance with the copy management information when any of the copy management information is detected upon detection result by said watermark detection means, in a case that the video and audio information is not encrypted in accordance with an encryption system which is corresponding to each of the kinds of said plurality of storage mediums and the recording format thereon.

4. A reproduction apparatus as defined in the claim 1, wherein the electronic watermark detection means is connected to receive and use non-decrypted video or audio information for detecting an electronic watermark information indicative of a copy management information.

5. A reproduction apparatus as defined in the claim 1, wherein a detected type of storage medium is used to set the predetermined encryption system expected in the detecting whether the video or audio information recorded in said storage medium is encrypted or not in accordance with the predetermined encryption system.

6. A reproducing method for reproducing video or audio information recorded in a storage medium, comprising:

an encryption system detecting for detecting whether the video or audio information recorded in the storage medium is encrypted in accordance with a predetermined encryption system or not;

an electronic watermark detecting for detecting electronic watermark information indicative of copy management information, including at least a copying prohibition which is superimposed onto the video or audio information, in a case where the video or audio information recorded in said storage medium is not encrypted in accordance with the predetermined encryption system; and a reproduction restricting for controlling reproduction of the video or audio information in accordance with said copy management information, when any one of the copy management information is detected upon a detection result of said electronic watermark detecting step.

7. A reproducing method, as described in the claim 6, comprising:

a medium and format deciding for deciding a kind from a plurality of storage mediums and a recording format thereof, wherein said encryption system detecting detects whether the data on said medium is encrypted or not in accordance with the encryption system which is corresponding to each of the kinds of said plurality of storage mediums and the recording format thereon, and reproduction of the video or audio information is stopped, in a case if not being encrypted in accordance with the encryption system corresponding to the kind of the storage medium and the recording format on said storage medium, which are decided in said medium and format deciding operation.

8. A system comprising:

a reproduction apparatus for reproducing video or audio information recorded in a storage medium, including:

an encryption system detection means for detecting whether the video or audio information recorded in said storage medium is encrypted or not in accordance with a predetermined encryption system;

an electronic watermark detection means for detecting an electronic watermark information indicative of a copy management information, including at least copy prohibition which is superimposed onto the video or audio information, in a case where the video or audio information recorded in said storage medium is detected in said encryption system detection means as being not encrypted in accordance with the predetermined encryption system; and a reproduction restricting means for controlling reproduction of the video or audio information in accordance with said copy management information, when any of the copy management information is detected upon a detection result by said watermark detection means, in a case where the video or audio information recorded in said storage medium is not encrypted in accordance with the predetermined encryption system; and at least one of: a reader to read information recorded in the storage medium and supply the same to the reproduction apparatus; and an output unit to receive an output of the reproduction apparatus to produce at least one of audio sound and video display.

9. A system as defined in the claim 8, wherein the reproduction apparatus comprising:

an information analysis means for analyzing whether the video or audio information recorded in said storage medium is a regular video or audio information or not, from which the electronic watermark can be detected in the watermark detection circuit, in the case where the video or audio information recorded in said storage medium is not encrypted in accordance with the predetermined encryption system, wherein said reproduction restricting means controls the reproduction of the video or audio information, when it is not decided to be the regular video or audio information from which the watermark can be detected, in the case where the video or audio information recorded in said storage medium is not encrypted in accordance with the predetermined encryption system.

10. A system as defined in the claim 8, wherein the reproduction apparatus comprising:

a medium and format deciding means for deciding a kind from a plurality of storage mediums and a recording format thereof, wherein, said encryption system detection means detects whether the data on said medium is encrypted or not in accordance with the encryption system which is corresponding to each of the kinds of said plurality of storage mediums and the recording format thereon, and, said reproduction restricting means controls reproduction of the video or audio information in accordance with the copy management information when any of the copy management information is detected upon detection result by said watermark detection means, in a case that the video and audio information is not encrypted in accordance with an encryption system which is corresponding to each of the kinds of said plurality of storage mediums and the recording format thereon.

11. A system as defined in the claim 8, wherein the electronic watermark detection means is connected to receive and use non-decrypted video or audio information for detecting an electronic watermark information indicative of a copy management information.

12. A system as defined in claim 8, wherein a detected type of storage medium is used to set the predetermined encryption system expected in the detecting whether the video or audio information recorded in said storage medium is encrypted or not in accordance with the predetermined encryption system.

* * * * *